Sept. 26, 1967 H. R. LEWIS 3,344,365
LASER SYSTEM EMPLOYING MEANS WITH NO MOVING PARTS
FOR PRODUCING AN ANGULARLY ROTATABLE BEAM
OF COHERENT LIGHT
Filed June 3, 1963
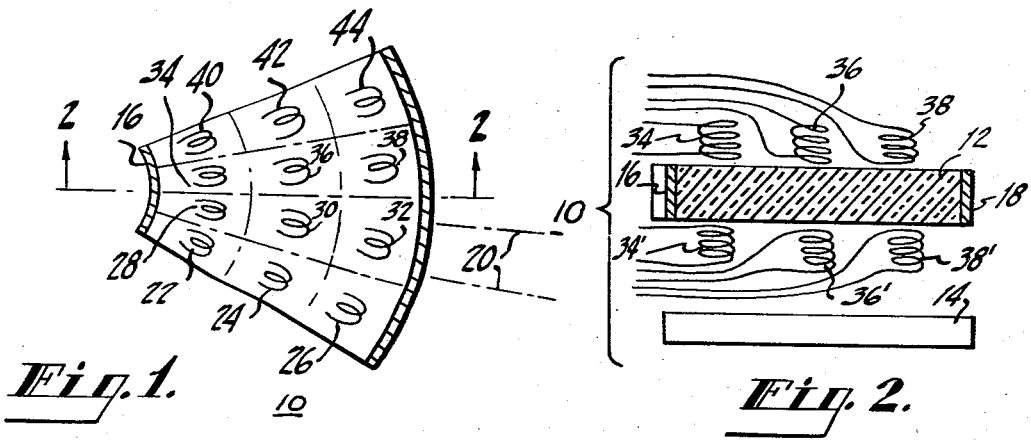
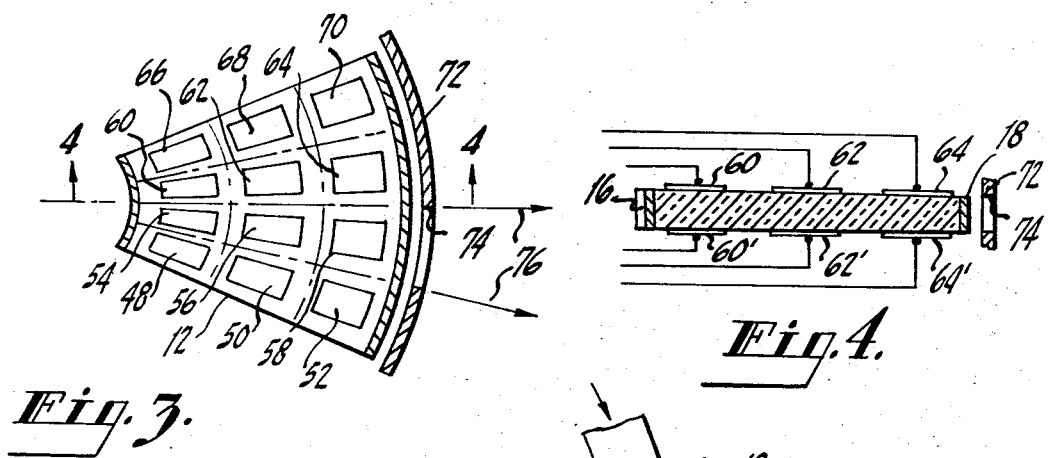
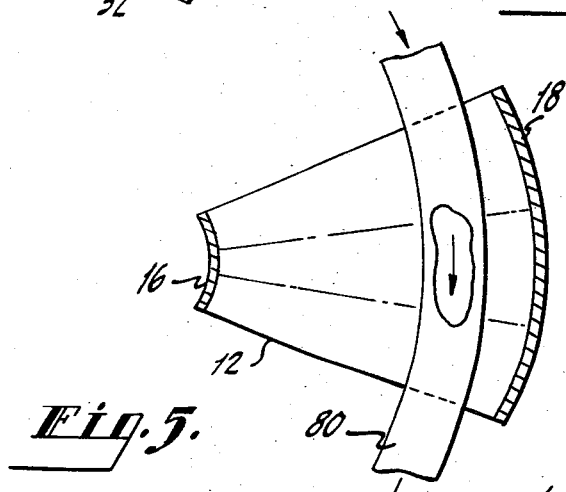
INVENTOR.
HENRY R. LEWIS
BY J. C. Whittaker
Attorney

United States Patent Office 3,344,365
Patented Sept. 26, 1967

3,344,365
LASER SYSTEM EMPLOYING MEANS WITH NO MOVING PARTS FOR PRODUCING AN ANGULARLY ROTATABLE BEAM OF COHERENT LIGHT
Henry R. Lewis, Princeton, N.J., assignor to Radio Corporation of America, a corporation of Delaware
Filed June 3, 1963, Ser. No. 285,070
4 Claims. (Cl. 331—94.5)

This invention relates to optical masers or lasers. In particular, this invention relates to a novel method of effectively deflecting a coherent light beam.

The term laser is a name used to refer to a device which provides "light amplification by stimulated emission of radiation." The laser device is most commonly used as a source of coherent light.

It is known that a light beam from a laser can be used for many things if the beam can efficiently be deflected. For example, the light beam could be amplitude modulated by controllably deflecting the coherent beam from behind an opaque mask. As another example such a laser beam could be used for steerable, optical transmitting and receiving beams of the kinds that are useful in certain types of optical radar.

Prior to this invention, many of the systems that have been proposed for deflecting a light beam have utilized mechanically moving parts, e.g., rotating mirror, etc. These deflecting schemes suffer from many disadvantages one of which is the low speed of response inherent in mechanical movements.

It is therefore an object of this invention to provide a new and improved means for effectively deflecting a coherent light beam.

It is another object of this invention to provide a novel system free of mechanically moving parts, for effectively deflecting a laser beam.

It is another object to provide an improved active laser body.

These and other objects are accomplished in accordance with this invention by providing an active laser body which is essentially in the shape of a sector of a toroid of rectangular cross section. By applying electric, or magnetic, fields to the active laser body, one portion of the body may be made to produce laser action while the other portions of the body will not. By varying the region of the body having the electric or magnetic fields, the selected region of the body producing the laser action may be changed which effectively changes the direction of the laser beam. In an embodiment of the invention, the laser beam is amplitude modulated by being deflected from behind an opaque mask.

The invention will be described in greater detail by reference to the accompanying drawings wherein:

FIG. 1 is a top view of a first embodiment of an active laser system in accordance with this invention;

FIG. 2 is a side view taken along lines 2—2 of FIG. 1;

FIG. 3 is a top view of a second embodiment of an active laser system in accordance with this invention;

FIG. 4 is a side view taken along line 4—4 of FIG. 3; and

FIG. 5 is a top view of another embodiment of this invention.

FIGS. 1 and 2 show a laser device 10 for producing coherent light radiation. The laser device 10 comprises an active laser body 12 having a pair of optically reflecting surfaces 16 and 18. The reflecting surfaces 16 and 18 form the opposite ends of an optical resonant cavity.

The active laser body is in the shape of the volume generated by moving a sector of an annulus normal to the plane of the annulus. In other words, the active laser body is a sector of a toroid of rectangular cross section, as illustrated, hereinafter referred to as toroidal. In accordance with this invention the active laser body may be of other shapes, but, during operation, a volume which is approximately a sector (the sectors and segments of the sectors are shown in phantom) of the toroidal shape will actually produce the laser light for selected energy levels. Therefore, the toroidal shape shown in FIG. 1 is the preferred shape for the active laser body 12.

The active laser body 12 may comprise any known substance which has two energy levels that are separated by an amount corresponding to a characteristic transition emission frequency. The active laser body 12 is made of a substance which has the property of being excitable into an inverted population density condition. In other words, the active laser body 12 is capable of having an excess population established in one of the upper energy levels as compared to a lower energy level. The active laser body 12 emits coherent electro-magnetic radiations as the atomic particles return from the upper energy level to the lower energy level.

Many of the known active laser materials are sensitive to an electric or magnetic field. By being sensitive to an electric or magnetic field, is meant either that the threshold level for laser operation is changed by the application of an electric or magnetic field, or the frequency produced in the laser body is changed by the application of an electric or magnetic field. In other words, for the "threshold" mode of operation, the magnitude of the inverted population density condition that is necessary for laser action to occur is dependent upon the magnetic or electric field applied to the active laser body. For the frequency mode of operation, an inverted population condition greater than threshold is established. Then, the net gain obtainable is dependent on the number of segments or areas amplifying at the same frequency, as determined by the magnetic field.

Some of the known active laser materials are more sensitive to applied fields than others. It is preferred to utilize one of the more field-sensitive active laser materials as the active laser body 12. The reason for this is that the less sensitive materials will require the application of larger fields, to establish a predetermined condition, making it more difficult to switch or change the fields at high speeds. Thus, if the device is to be used in an application which requires high speed switching, a material is used as the active laser body 12 which is very sensitive to the fields that are to be applied. Examples of known active laser materials which are highly sensitive to electric and/or magnetic fields, with respect to both the frequency and the threshold modes of operation, are dysprosium-doped calcium fluoride and thulium-doped calcium fluoride. A specific example of an active laser body is a crystal of five parts thulium per 10,000 parts calcium fluoride which is a sector of a toroid of rectangular cross section that is approximately two cm. long and one half cm. thick.

The active laser body 12 is positioned in a resonant cavity formed by the light reflecting surfaces 16 and 18. The light reflecting surfaces 16 and 18 are precisely oriented so that one or more resonant modes will exist between the light reflecting surfaces at frequencies for which the spacing therebetween is an integral number of half wavelengths. At least a portion of the light reflecting surface 18 is partially transparent so that a coherent light output beam 20 may be obtained from the laser device 10.

The light reflecting surfaces 16 and 18 are positioned on the ends of the toroidal shaped active laser body 12. Therefore, the light reflecting surfaces 16 and 18 are segments of concentric cylinders. The light reflecting surfaces 16 and 18 may comprise any known light reflecting material, such as a layer of aluminum or an interference type reflecting body. The light reflecting surface 18 may comprise a layer of aluminum that is approximately three percent transparent.

Alternatively, the light reflecting surfaces may comprise the interface between the active body 12 and air. For example, the ends of the active laser body 12 may be optically polished and, when the index of refraction of the body 12 is substantially different from that of air, sufficient light reflection will occur to efficiently provide a resonant cavity within the active laser body 12.

Positioned adjacent to the active laser body 12 is a pumping source 14. The pumping source may comprise any known source of energy which is capable of exciting the atomic particles in the active laser body 12 from a lower energy level into one of the higher energy levels. In other words, the pumping source 14 is a source of energy for establishing the inverted population density condition. Examples of such pumping sources are a radio frequency field or a xenon flash tube. Also, certain types of active laser materials, e.g., gallium arsenide, may be electrically pumped. In this instance, pulse generators can be used as pumping sources. If all the regions in a given sector of the active laser body are pumped simultaneously, light will emerge in the direction determined by that sector.

Positioned adjacent to the upper and lower surfaces of the active laser body 12 are a plurality of electro-magnetic coils 22 through 44. On the bottom side of the active laser body 12 are corresponding electro-magnetic coils 22' through 44' as illustrated in FIG. 2.

By energizing selected coils, e.g., 28–28', 30–30' and 32–32', which are the coils adjacent to one complete sector, any desired magnetic field may be established in a selected sector of the active laser body 12 that is adjacent to these coils. When the magnetic field established along any entire sector, i.e., between light reflecting surface 16 and light reflecting surface 18, is at substantially the same magnetic field strength, then, when the active laser body is pumped to an energy level that is above the threshold level, a greater gain will occur in this sector. Because of the greater gain, laser action occurs and a coherent light output beam 20 is obtained from this sector only at a predetermined pump level. By changing the fields provided by the coils 22 through 44, any other sector of the active laser body 12 may be selected to amplify one particular frequency so that laser action, and an output coherent light beam 20, will be generated in the other selected sector. Thus, effective movement or deflection of the beam 20 is produced.

During operation of this device 10, it is not necessary that all of the regions or segments of the various sectors have different fields to prohibit establishing a large enough gain at one frequency, in these sectors, for laser action. As long as one or more region or segment in a given sector has a field that is different from the other regions in that sector, the gain established at a given frequency, in that sector, will not be sufficient to produce the stimulated emission.

Thus, if all of the segments of a sector have substantially the same magnetic field applied thereto, and the population inversion build up in that active laser body is greater than the threshold level, that sector will produce output coherent radiation.

Another method of operation is the "threshold" method. In this method, an inverted population density condition, great enough to produce laser action, cannot be achieved under certain magnetic or electric field conditions, and it can be established under other field conditions. By selecting the magnitude or direction of the magnetic field applied to the various regions of a selected sector, the sector can be switched into, and out of, a condition in which a predetermined pump power level can establish the necessary threshold level of population inversion for laser action to occur.

As an example, using an active laser body of dysprosium-doped calcium fluoride ($Dy^{2+}:CaF_2$) a change in magnetic field strength of approximately 50 gauss will prohibit a population inversion greater than threshold from being obtained when the pump power is 200 watts. By changing the magnetic field back to its optimum value, this pump power is sufficient to establish a population inversion greater than threshold thus producing the laser action.

The electro-magneto coils 28 through 44 have been shown as conventional coils. It should be clearly understood that any known structure for providing any selected magnetic field to selected regions of the active laser body 12 may be used. As was previously pointed out, the active laser body material is selected to have a high sensitivity to the magnetic field so that the coils 22 through 44 may be rapidly switched. In the example illustrated and described, under certain operating conditions, a magnetic field strength of H gauss (about 40 gauss is suitable) in all of the segments of one sector will produce amplification and therefore gain at one frequency, and laser action. Whereas, one region having a magnetic field strength of H plus about 10 gauss, when the material is $Dy^{2+}:CaF_2$, will prohibit the buildup of the threshold level.

The direction of the magnetic field applied will, in general, depend upon the active material selected as the active laser body 12. It should be understood that only twelve coil pairs have been shown, but any number of coils may be used with this invention. The coils may be energized either alone, or in any desired combination, by any suitable energy source (not shown).

FIGS. 3 and 4 show an embodiment wherein the active laser body 12 is coated with a plurality of electrostatic deflection plates 48 through 70 on one side and 48' through 70' on the opposite side. This embodiment operates in a manner similar to that described in connection with FIGS. 1 and 2 except that an electric field is applied to the various areas of the active laser body 12 rather than a magnetic field. The electrostatic plates 48 through 70 may be formed of any conventional material and structure. One example of an electrostatic deflecting plate is a plate made of nickel. Also, the electrostatic plates may be energized by any conventional source in any desired combination of plates.

Positioned adjacent to the output side of the laser body 12 is an opaque mask 72 having a transparent aperture 74. When the coherent laser beam is deflected from behind the mask 72, to pass through the aperture 74, an amplitude modulated light beam 76 is provided. With signals controlling the fields applied to the electrostatic plates 48–70, the amplitude modulation will be in proportion to the signals applied.

The electric field producing means have been shown as separate elements, i.e., the coils of FIG. 1 and the plates of FIG. 2. It should be clearly understood that continuous field producing means such as a traveling wave structure 80 of FIG. 5 can be used. The traveling wave structure 80 can be a meander line, a resistive coating, a movable magnetic field or other similar device so that the applied field may be "swept across" a sector, or a segment, of the toroidal body 12 to provide continuous movement of an output light beam. The traveling wave may be propagated along the structure 80 in any desired sequence or timed intervals.

It should be understood that two or more active laser bodies may be positioned in optical series relationship to provide deflection of a light beam in two or more dimensions.

What is claimed is:
1. A laser for generating a beam which appears to emanate from a particular axis and which beam extends in any of a plurality of different desired angular radial directions with respect to said axis, said laser comprising a solid active lasing material bounded by an outer surface in the form of a given sector of a first circular cylindrical surface with respect to said axis, said first circular cylindrical surface having a first given radius, an inner surface in the form of said given sector of a second circular cylindrical surface which is substantially coaxial with said outer surface, said second circular cylindrical surface having a second given radius smaller than said first given radius, top and bottom substantially parallel surfaces each of which is substantially perpendicular to said outer and inner surfaces and respective side surfaces interconnecting said top and bottom and inner and outer surfaces which side surfaces are substantially perpendicular to said top and bottom surface, means for defining an optical resonant cavity between said inner and outer surfaces, means for applying a given amount of pumping energy to said active lasing material sufficient to normally cause the threshold level of population inversion to be reached for lasing to occur, and selectively operable gain reducing means in cooperative relationship with said active lasing material for permitting lasing to occur in only a selected desired angular radial direction with respect to said axis.

2. The laser defined in claim 1, wherein said selectively-operable gain reducing means comprises means for selectively applying a magnetic field through selected portions of said active lasing material.

3. The laser defined in claim 1, wherein said selectively operable gain reducing means comprises means for selectively applying an electric field through selected portions of said active lasing material.

4. The laser defined in claim 1, wherein said selectively-operable gain reducing means comprises means for moving a traveling wave of electromagnetic energy over said given sector of said active lasing material.

References Cited

UNITED STATES PATENTS

| 3,062,959 | 11/1962 | Sclar | 331—94.5 |
| 3,222,615 | 12/1965 | Holly | 331—94.5 |
| 3,223,944 | 12/1965 | Luck et al. | 331—94.5 |

FOREIGN PATENTS 608,711  3/1962  Belgium.

JEWELL H. PEDERSEN, *Primary Examiner.*

W. L. SIKES, *Examiner.*